United States Patent
Donovan et al.

(10) Patent No.: US 10,296,521 B2
(45) Date of Patent: *May 21, 2019

(54) METHOD AND SYSTEM FOR PROVIDING CONTENT TO USERS BASED ON FREQUENCY OF INTERACTION

(71) Applicant: About, Inc., New York, NY (US)

(72) Inventors: Kevin R J B Donovan, White Plains, NY (US); James K. Toothman, Oak Ridge, NJ (US); Wen-Wei Wang, Scarsdale, NY (US); Tara Long, New York, NY (US)

(73) Assignee: ABOUT, INC., New York, NY (US)

( * ) Notice: Subject to any disclaimer, the term of this patent is extended or adjusted under 35 U.S.C. 154(b) by 516 days.

This patent is subject to a terminal disclaimer.

(21) Appl. No.: 14/831,026

(22) Filed: Aug. 20, 2015

(65) Prior Publication Data
US 2015/0356165 A1 Dec. 10, 2015

Related U.S. Application Data

(63) Continuation of application No. 10/942,923, filed on Sep. 17, 2004, now Pat. No. 9,143,572.

(51) Int. Cl.
*G06F 15/16* (2006.01)
*G06F 16/28* (2019.01)
(Continued)

(52) U.S. Cl.
CPC ........ *G06F 16/285* (2019.01); *G06F 16/9535* (2019.01); *G06F 17/30598* (2013.01);
(Continued)

(58) Field of Classification Search
CPC ....... H04L 67/22; H04L 67/14; H04L 67/306; H04L 43/10
See application file for complete search history.

(56) References Cited

U.S. PATENT DOCUMENTS 5,019,961 A   5/1991  Addesso et al.
5,088,052 A   2/1992  Spielman et al.
(Continued)

FOREIGN PATENT DOCUMENTS

EP   0 926 591   6/1999
EP   1 160 713   12/2001
(Continued)

OTHER PUBLICATIONS

Bernes-Lee, T., "Hypertext Transfer Protocol—HTTP/1.0"; University of California, Irvine; http://www.ics.uci.edu/pub/ietf.http/rfc1945.html; May 1996.
(Continued)

*Primary Examiner* — Dhairya A Patel
(74) *Attorney, Agent, or Firm* — Hunton Andrews Kurth LLP

(57) ABSTRACT

A system and method for providing content to a user based on at least one prior user experience are provided. First content is transmitted to a user, wherein at least some of the first content is transmitted in response to one or more user content selections. Frequency information based on the inputs and/or the first content is stored. A request for content is received from the user. Second content is selected based on the frequency information.

20 Claims, 5 Drawing Sheets

(51) Int. Cl.
  *G06F 17/30* (2006.01)
  *H04L 29/06* (2006.01)
  *H04L 29/08* (2006.01)
  *G06F 16/9535* (2019.01)
  *G06Q 30/02* (2012.01)

(52) U.S. Cl.
  CPC ....... *G06F 17/30867* (2013.01); *G06Q 30/02* (2013.01); *H04L 67/02* (2013.01); *H04L 67/146* (2013.01); *H04L 67/22* (2013.01); *H04L 67/306* (2013.01); *H04L 67/42* (2013.01)

(56) References Cited

U.S. PATENT DOCUMENTS

| | | | |
|---|---|---|---|
| 5,347,632 | A | 9/1994 | Filepp et al. |
| 5,359,508 | A | 10/1994 | Rossides |
| 5,361,393 | A | 11/1994 | Rossillo |
| 5,442,771 | A | 8/1995 | Filepp et al. |
| 5,572,643 | A | 11/1996 | Judson |
| 5,712,979 | A | 1/1998 | Graber et al. |
| 5,717,860 | A | 2/1998 | Graber et al. |
| 5,778,368 | A | 7/1998 | Hogan et al. |
| 5,787,450 | A | 7/1998 | Diedrich et al. |
| 5,790,785 | A | 8/1998 | Klug et al. |
| 5,802,518 | A | 9/1998 | Karaev et al. |
| 5,812,769 | A | 9/1998 | Graber et al. |
| 5,819,271 | A | 10/1998 | Mahoney et al. |
| 5,819,285 | A | 10/1998 | Damico et al. |
| 5,835,712 | A | 11/1998 | DuFresne |
| 5,864,871 | A | 1/1999 | Kitain et al. |
| 5,897,622 | A | 4/1999 | Blinn et al. |
| 5,918,010 | A | 6/1999 | Appleman et al. |
| 5,933,811 | A | 8/1999 | Angles et al. |
| 5,960,429 | A * | 9/1999 | Peercy ............... G06F 17/30864 707/752 |
| 5,963,924 | A | 10/1999 | Williams et al. |
| 6,026,474 | A | 2/2000 | Carter et al. |
| 6,044,218 | A | 3/2000 | Faustini |
| 6,052,717 | A | 4/2000 | Reynolds et al. |
| 6,421,729 | B1 | 7/2002 | Paltenghe et al. |
| 6,484,149 | B1 | 11/2002 | Jammes et al. |
| 6,564,260 | B1 * | 5/2003 | Baber ................. G06F 17/3089 707/E17.116 |
| 6,681,247 | B1 * | 1/2004 | Payton ............... G06F 17/30595 707/999.005 |
| 6,757,001 | B2 * | 6/2004 | Allport ................. G06F 1/1626 345/184 |
| 7,003,517 | B1 | 2/2006 | Seibel et al. |
| 7,177,945 | B2 * | 2/2007 | Hong ..................... H04L 29/06 370/389 |
| 7,272,639 | B1 * | 9/2007 | Levergood ............ H04L 63/10 709/203 |
| 7,299,275 | B2 * | 11/2007 | Tsukidate ............ H04N 7/17354 348/E7.075 |
| 7,359,955 | B2 * | 4/2008 | Menon ............... G06F 17/30899 709/219 |
| 7,428,706 | B2 * | 9/2008 | Hagan ................. G06F 21/6254 707/E17.109 |
| 8,027,822 | B2 * | 9/2011 | Turgiss ............... G06F 19/3418 703/11 |
| 8,442,002 | B2 * | 5/2013 | Zhou ..................... H04L 5/0037 370/330 |
| 2001/0011264 | A1 | 8/2001 | Kawasaki |
| 2001/0037192 | A1 * | 11/2001 | Shimamoto ............ G06Q 30/06 704/8 |
| 2001/0042110 | A1 * | 11/2001 | Furusawa ............. H04L 67/101 709/219 |
| 2002/0078054 | A1 * | 6/2002 | Kudo ................. G06F 17/30867 |
| 2002/0147593 | A1 * | 10/2002 | Lewis ..................... G10L 15/22 704/275 |
| 2002/0152318 | A1 * | 10/2002 | Menon ............. G06F 17/30899 709/231 |
| 2002/0161611 | A1 * | 10/2002 | Price ..................... G06Q 30/02 705/346 |
| 2002/0165967 | A1 * | 11/2002 | Morgan ............ G06F 17/30867 709/227 |
| 2004/0210661 | A1 * | 10/2004 | Thompson ............. G06Q 30/02 709/228 |
| 2004/0215718 | A1 * | 10/2004 | Kazmi ................ H04L 65/4084 709/203 |
| 2005/0033657 | A1 | 2/2005 | Herrington et al. |
| 2005/0044178 | A1 * | 2/2005 | Schweier ............ G06F 17/2235 709/218 |
| 2006/0059225 | A1 * | 3/2006 | Stonehocker ..... G06F 17/30884 709/202 |
| 2006/0075019 | A1 * | 4/2006 | Donovan .......... G06F 17/30867 709/203 |
| 2011/0103371 | A1 * | 5/2011 | Russell ................. H04L 41/147 370/352 |

FOREIGN PATENT DOCUMENTS

| | | |
|---|---|---|
| EP | 2003-108873 | 4/2003 |
| WO | WO 98/02087 | 1/1998 |
| WO | WO 01/73565 | 4/2001 |

OTHER PUBLICATIONS

Burke, J., "Web Databases with Cold Fusion 3"; McGraw-Hill, 1997.
Dallas, A., "Using Collabra Share 2," Que, 1995.
Graves, S., "FrontPage 97 Web Sites," The Coriolis Group, Inc., 1997.
"HTML," w3, http://www.w3.org/History/19921103...t/.hypertext/WWW/MarkUp/MarkUp.html.
"HTML Quick Reference," The University of Kansas, http://www.cc.ukans.edu/~acs/docs/other/HTML_quick.shtml.
"HTML Reference Manual," Sandia National Laboratories, http://www.sandia.gov/sci_compute/html_ref.html; Jan. 2, 1996.
Miller, K., et al., "Inside Microsoft Visual InterDev," Microsoft Press, 1997.
Kurnit's Startup: Mining for Ad Deals and Intrigue, by Robert Silverman, dated Feb. 12-25, 1997.
About.com—Our Story: http://ourstory.com/index.htm?COB=home&PID, 1999.
LookSmart's Beseen: http://www.beseen.com, 1999.
Yahoo! GeoCities—Yosemite; http://www.geocities.com/Yosemite, 1994-99.
GeoCities—Pages That Pay—About PTP; http://geocities.yahoo.com/pagesthatpay/ptp_overview.htm, 1994-99.
Document Count Them In; http://proquest.umi.com/pqdweb?TS=...&Sid=3&ldx=28&Deli=1&RQT=309&D.
A Beginner's Guide to HTML, NCSA, ncsa.uiuc.edu, revised Apr. 96, edits: Jul. 1996; Sep. 1996; Jan. 1997.
Shelton, D., Yahoo goes local with Bay Area guide, Jun. 24, 1996, CNET.com—News—Entertainment & Media; http://news.cnet.com/news/0-1005-200-311623.html.
Yahoo Scores Big-Name Financing, Nov. 29, 1995, CNET.com—News—Communications—YahooScores Big-Name Financing, http://news.cnet.com/news/0-1004-200-310097.html?tag=.
Aguilar, R., Yahoo loves New York, Sep. 8, 1996, CNET.com—News—Enterprise Computing—Yahoo loves New York, http://aolcom.cnet.com/news/0-1003-200-312489.html.
Canada Office Communication dated Feb. 6, 2014.
International Search Report dated Jun. 4, 2008 issued in PCT/US05/33702.

\* cited by examiner

METHOD AND SYSTEM FOR PROVIDING CONTENT TO USERS BASED ON FREQUENCY OF INTERACTION

RELATED APPLICATIONS

This patent application is a Continuation of U.S. patent application Ser. No. 10/942,923 filed Sep. 17, 2004. which is hereby incorporated by reference herein in its entirety.

FIELD OF THE INVENTION

The present inventions relate to providing content to a user over an electronic medium based on a user's experience with prior provided content.

BACKGROUND OF THE INVENTION

Internet users typically visit the same websites multiple times. For instance, users may visit a particular news site such as cnn.com every morning. Shoppers may visit amazon.com several times each year to make various birthday and holiday gift purchases. Sports enthusiasts may frequent a popular sports site such as espn.com, and the frequency of their visits may increase during the season of their favorite sport. While websites typically change their content over time to provide a more varied user experience, they typically provide the same content to all users. Thus, a user in Dallas who accesses cnn.com may receive the same news content as a user in New York who accesses the same site at the same time.

Some sites provide content specific to a user. For instance, when a user visits amazon.com, the website may display information related to their last purchase at amazon.com. In this way, the content provided to each user may be different.

Other sites allow a user to personalize a website by configuring the content provided on the site. For instance, yahoo.com enables users to configure a "my page" that shows news stories of a type selected by the user, weather predictions for an area selected by the user, and links selected by the user, all in a layout selected by the user. In this scenario, the content provider merely provides content according to the user's pre-determined specifications. All yahoo users who select "technology news" for their "my page" will receive the same technology news.

The extent to which content providers provide user-specific content is limited. Rather, the vast majority of content on the Internet is provided identically to all users who access a particular website. As a result, a significant portion of content provided to a specific user may not be of interest to that user. This content is essentially wasted space that takes the place of other content that may be more relevant to the user.

These and other drawbacks exist with current systems and methods.

SUMMARY OF THE INVENTION

Accordingly, various embodiments of the present inventions may be directed to a system and method for providing content to a user based on at least one prior user experience. First content is transmitted to a user, wherein at least some of the first content is transmitted in response to one or more user content selections. Frequency information related to the first content or the one or more inputs is directed. A request for content is received from the user. Second content is selected for the user based on the frequency information.

According to another embodiment of the invention, a system for providing content to a user based on at least one prior user experience is provided. An output device transmits first content to a user, wherein at least some of the first content is transmitted in response to one or more user content selections. A data storage controller directs storage of frequency information related to the first content or the one or more inputs. An output device receives a request for content from the user. A processor selects second content for the user based on the frequency information.

According to another embodiment of the invention, a method for receiving content from a content provider based on at least one prior user experience is provided. First content is received by a user from a content provider, wherein at least some of the first content is transmitted in response to one or more inputs, wherein each input indicates a user selection. Frequency information related to the inputs and/or the first content is stored. A request for content is transmitted to the server. Second content is received, wherein the second content is selected based on the frequency information.

According to another embodiment of the invention, a system for receiving content from a content provider based on at least one prior user experience is provided. An input device receives first content by a user from a content provider, wherein at least some of the first content is received in response to one or more inputs, and wherein each input indicates a user selection. The input device also receives second content selected based on stored frequency information. A storage device stores the frequency information related to the inputs and/or the first content. An output device transmits a request for content to the server.

According to another embodiment of the invention, a method for providing content to a user based on at least one prior user experience is provided. One or more web page documents are transmitted to a user by a content provider. One or more first content selections are received by the content provider from the user based on the one or more web page documents. Storage of frequency information in a cookie on the user's system is directed, the frequency information adding data related to activity of the user related to a website or collection of pages at that website. A request for a web page document is received from the user. The stored frequency information is received. A specific web page document is selected based on the stored frequency information. The specific web page document is transmitted to the user.

According to another exemplary embodiment, a system for providing content to a user based on at last one prior user experience is provided. A controller directs storage of frequency information in a cookie on a user's system. The frequency information adds data related to activity of the user related to a website or collection of pages at that website. An output device transmits one or more web page documents to the user by a content provider and transmits a selected specific web page document to the user. An input device receives one or more first content selections from the user based on the one or more web page documents. The input device also receives the frequency information from the cookie, and it also receives a request for a web page document from the user. A processor selects the specific web page document based on the stored frequency information.

DETAILED DESCRIPTION OF EXEMPLARY EMBODIMENT(S)

An embodiment of the present invention provides for providing content to a user based on prior content provided to the user. A user selects and receives content, and data relating to the selecting and receiving is stored in a database, such as a cookie on the user's computer. This data can be processed to track a user's behavior and experience of provided content, such as a user's selections of content and the frequency with which a user visits a particular website. Based on these results, content can be provided that is more tailored to the user's behavior and preferences. For instance, a server may use prior visit information to provide users news content that was added after the user's last visit to the site.

According to various embodiments of the invention, a system may provide content to a user based on the frequency with which the user visits a particular website domain, or a specific type or sub-domain of content at a particular website domain. By providing content based on user frequency data, the system can tailor the user's experience with a domain or content set based on a user's familiarity with the site (or sub-set of the site). For instance, the system may stop providing content frequently ignored by the user, and the system may highlight content frequently selected by the user. In this way, the system may provide a higher concentration of useful content to the user. By improving the user's experience at the site or sub-set of a site, a user may increase frequency of visits and average duration per visit. Further, the relationship between the site and the user may be strengthened.

Overview and System Architecture

Figure 1:
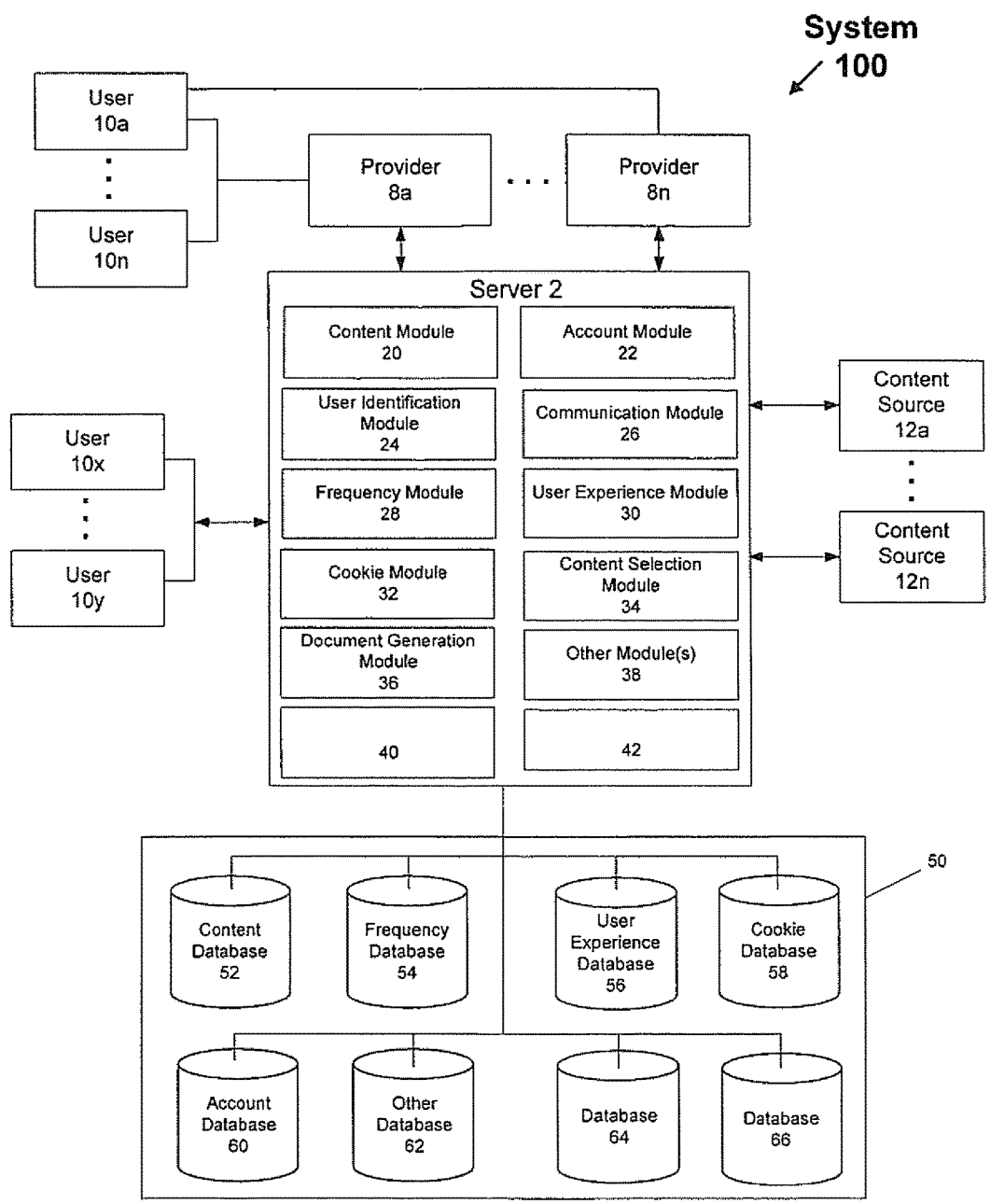
FIG. 1 depicts a system for providing content to a user based on prior content provided to the user according to an embodiment of the invention.

FIG. 1 depicts a system 100 for providing content to a user based on prior content provided to the user.

The system 100 may comprise one or more servers 2 coupled to one or more databases 4, one or more user data receivers 6a-6n, one or more providers 8, one or more users 10a-10n, one or more content sources 12a-12n.

The server 2 may receive documents and other information from content sources 12a-12n and store the documents and information in the database 4. One or more of these documents may be provided to users 8, e.g., when users access one or more websites. Users 10a-10n may interact with the document (e.g., by clicking on various embedded links), contact the content source, make a purchase based on the document, or otherwise provide information in response to the document.

Providers 8 may provide documents to one or more end-users, 10a through 10n. Providers 8 may include a content provider, search engine, or other entity that makes available information, services, and/or products over an electronic network, such as the Internet. A provider 8 may include one or more of the following, for example: an advertisement listings provider, an electronic document provider, a website host, a server, any other entity that provides electronic documents to users or other entities, or any other provider of content.

Users 10a-10n may comprise persons who may receive documents, e.g., by viewing a web page or listening to and/or viewing another audio and/or video document.

Users 10 may receive information from providers 8 and server 2 at a display device, which may comprise any audio and/or video output device, such as a television, video monitor, projector, speaker, touch-screen display, hologram, mechanical billboard, image generator, or other display or speaker device. Users 10 may pass information to providers 8 and server 2 via any input device, such as a mouse, keyboard, microphone, or other input device. Using one or more input and output devices, users 10 may accordingly communicate with providers 8 and server 2, e.g., by transmitting or otherwise passing information between and among each other.

Content sources 12 may generate documents and/or document information and pass the documents and/or information to the server 2. For instance, content sources 12 may provide content such as text (e.g., articles), images, video (e.g., video files), audio (e.g., audio files), animations such as pop-ups, and other content (sometimes generically referred to herein as "documents"). For instance, content sources may provide articles and advertisements that may be displayed on a domain's web pages output to users 10 by server 2 (e.g., via providers 8).

Content sources 12 may comprise a content provider, search engine, or other entity that makes available information, services, and/or products over an electronic network, such as the Internet. Content source 12 may include one or more of the following, for example: a document listings provider, an electronic content source, a website host, a server 2, any other entity that provides electronic documents to users or other entities, or any other provider of content.

The server 2 may comprise a computer, server, hub, central processor, or other entity in a network, or other processor. In some embodiments, the server 2 may comprise a particular content source and be associated with a particular Internet domain (e.g., www.domain.com), and the server 2 may generate and output web pages of the domain to users 10 and providers 8. The server 2 may comprise input and output devices for communicating with other various system 100 elements, e.g., 4, 6, 8, 10, 12, 14, e.g., by transmitting and receiving data.

The server 2 may comprise a plurality of modules, such as a content module 20, account module 22, user identification module 24, communication module 26, frequency module 28, user experience module 30, cookie module 32, document generation module 36, content selection module 34, and other module 38.

Content module 20 may request and receive content such as documents, document information, or other information from content sources 12. Content may be uploaded by identifying an address (e.g., URL address, etc.) where the document is stored. The content may be downloaded from the content source's 12 website or other associated site or data location. The content may be retrieved from a database or other source. The content module 20 may size or shape the document to fit a predetermined size or shape, e.g., the size and shape of a particular display device 8a. Alternately (or in addition), the content source 12 may select from a selection of sizes and/or shapes for display.

Content module 20 may also store documents (converted or unconverted) and other information in a document database 52.

Account module 22 may manage one or more accounts associated with one or more users 10. An account may comprise an account with a domain 2, such as a domain affiliated with the server 2 (e.g., an account with the website www.domain.com, or an account at a site within the domain such as www.type1.domain.com). Account module 22 may enable users to establish such accounts. Account module 22 may communicate with providers 8, users 10 to pass and receive user account data, and it may access and store such data in the account database 60. Account module 22 may enable users to login and logout of sessions with the server 2.

Account module 22 may interact with users 10 based on user frequency data and other user data (e.g., data stored in cookies), described below. For instance, account module 22 may pass account login information (e.g., a request to login to an account) based on cookie information indicating that the user 10 has an account with the domain. In some embodiments, account module 22 may pass account information (e.g., a link for registering for an account) based on the frequency with which the user 10 visits a particular sub-set of the domain (e.g., a guide site/channel of the domain).

User identification module 24 may identify users or user information based on data. For instance, user identification module 24 may identify users based on account login information and/or cookies stored on a device used by the user to access the server 2, such as a user's computer. For instance, a cookie stored on a user's 10 computer during a prior session may identify the user, and the cookie information can be received by the user identification module 24 during a subsequent session, wherein the module 24 identifies the user. The server 2 may subsequently pass information to the user 10 based on information associated with the user's identity, such as frequency information.

Communication module 26 may communicate with users 10, providers 8, and content sources 12. The communication module 26 may comprise any communication device, such as a processor with an input and/or output device. In one embodiment, the communication module 26 may comprise a server or computer configured to receive user 10 inputs (e.g., from a user input device such as a keyboard) and pass information for output to the user 10.

Frequency module 28 may determine and process (e.g., track) frequency information. Frequency information may comprise information related the occurrence or non-occurrence of any specific event or type of event related to content received by a user 10 or behavior by a user 10 (e.g., selections of a content by a user). For instance, frequency information may comprise information relating to the frequency with which users do any of the following: visit a particular website (e.g., www.domain.com); visit a particular type of websites (or sub-group of websites, such as www.type1.domain.com/ContentPage); receive particular content (or a particular type of content); select a particular type of content; fail to visit a particular site or select a particular type of content; or have (or fail to have) any other experience with content associated with the server 2. For example, frequency module 28 may track how often a user accesses a particular subset of content (e.g., channel or guide) at a particular domain and how often the user fails to select a particular type of ad or access other provided content. For instance, frequency module 28 may track how often a user accesses a domain such as www.about.com, the "Food and Drink" guide channel at www.about.com/food/, or the "barbecue" sub-channel of the "Food and Drink" guide (at www.bbq.about.com).

Frequency module 28 may also process and/or determine any relation between or among any of the frequency data, or any relation between or among the frequency and other user or content-related data. For instance, frequency module 28 may track the frequency with which users from California received but did not select an invitation to join a distribution list relating to widescreen televisions. Frequency module 28 may determine other correlations and associations between frequency and other user data, and this information may be classified in groups. For instance, users 10 who visit a domain or channel with a frequency above and/or below a specific amount (e.g., between once a week and five times a week) may be classified in a group such as "moderate users." Frequency module 28 (and/or cookie module 32) may then store such information in a database (e.g., frequency database 54 or a cookie at a user 10 storage system such as a computer) so that it may be processed and accessed for later interactions with the user 10.

The Frequency module 28 may comprise a system that provides conditional templates based on user 10 frequency, as described below. The module 28 may serve the navigation needs of users 10 in various stages of usage frequency at a domain or sub-domain level, such as infrequent/new, moderate, and heavy.

In order to track frequency information, frequency module 28 may store time information, such as a "Lightweight Time" or some other format. For instance, it may store time information (such as a Lightweight Time) in a format of YMDH (year-month-day-hour). "Y", or "year", may begin at 0001 and correspond to the year 2001, and 0005 may correspond to 2005. "M", or "month", may range from 01-12 corresponding to January through December. "D", or "day", may range from 01-31 corresponding to the first of the month through the thirty-first day of the month (e.g., for months having 31 days). Digits used in cookies may be "base 64 digits", such as the following group of digits (e.g., alpha-numerics):

0123456789ABCDEFGHIJKLMNOPQRSTUVWX YZ[ ]abcdefghijldmnopqrstuv wxyz

The ordering of these digits may be in ASCII sequence order or other formats. These digits may be chosen based on their compatibility with various web technologies, such as URLs/URIs, Unix file systems, and cookies.

In some embodiments, the time (e.g., Lightweight Time) can be set in a file. A script may modify the specific setvar (e.g., mechanism which sets variables) daily to set the time (or with another frequency, such as hourly or weekly). In other embodiments, a program or file (such as "Mod_Include") may be modified to set the time variable on a request initialization or when a specific directive is invoked.

In some embodiments, a frequency server side include (SSI) directive may increase a frequency counter (e.g., a frequency counter maintained by the frequency module 28 or at a user's cookie) and set a variable indicating what frequency level an AFT counter is at. The frequency SSI directive may take the form:

<!--#freq var="zFDT" test="test_string" counter="_zFD"-n--> where "var" is the variable to store the results of the test into, "test" is the string to use to evaluate the frequency test against, and "counter" is the variable name to apply the frequency set and test against. Although this directive may either create or modify the counter string, in some embodiments it may not set it back into the cookie. That function may be accomplished in head-inc with a meta tag.

In some embodiments, the following environment variables (e.g., Apache SSI environment variables) may be established and/or reserved for AFT Navigation:

_zFD. This may comprise an AFT Counter string pulled from the root domain (e.g., www.domain.com) cookie. An AFT Counter may comprise a compact string that indicates and/or tracks the frequency of a given user on either a domain or sub-domain level. It may be stored in a cookie or another database.

_zFS. This may comprise an AFT Counter string pulled from a subset (e.g., domain or channel) of the domain cookie (e.g., a cookie for www.type1.domain.com, or www.domain.com/type1 or www.type1.com).

zFDT. This variable may comprise the result of the test for tests against _zFD.

zFST. This variable may comprise the result of the test for tests against _zFS.

In some embodiments, an AFT Counter may take the form of:

$YMD^1C^dYMDC^1YMDC^2YMDC^3YMDC^40YMCCF^1YMCCF^2YMCCF^3YMCCF^40YCCCFF^1YCCCFF^2YCCCFF^3$

Where, in sequence:

$YMD^1$ may be the last Lightweight Time stamp of the last time the AFT Counter was updated.

$C^d$ may be the total count of pages where $YMD^1$ was equal to the current Lightweight Time. In some embodiments, this counter may not exceed 63.

$YMDC^1$ may be the Year, Month, Day, and page Count for the Year, Month, and Day of the last visit prior to $YMD^1$.

$YMDC^2$ may be the Year, Month, Day, and page Count for the Year, Month, and Day of the last visit prior to $YMDC^1$.

$YMDC^3$ may be the Year, Month, Day, and page Count for the Year, Month, and Day of the last visit prior to $YMDC^2$.

$YMDC^4$ may be the Year, Month, Day, and page Count for the Year, Month, and Day of the last visit prior to $YMDC^3$.

0 may be a terminator of the possible YMDC list.

$YMCCF^1$ may be the Year, Month, page Count (e.g., a Count may have a maximum, such as 4095), and Frequency (e.g., one tick per unique Day visited in the corresponding YM). In some embodiments, YM should match the YM of $YMD^1$. In some embodiments, it is only possible for one or more variables of the form $YMCCF^N$ not to be present if the AFT Counter is not initialized.

$YMCCF^2$ may be the Year, Month, page Count (which may have a maximum, such as 4095), and Frequency of the last YM prior to $YMCCF^1$ in which the user visited.

$YMCCF^3$ may be the Year, Month, page Count, and Frequency of the last YM prior to $YMCCF^2$ in which the user visited.

$YMCCF^4$ may be the Year, Month, page Count, and Frequency of the last YM prior to $YMCCF^3$ in which the user visited.

0 may be a terminator of the possible YMDC list. In some embodiments, it may only be possible for this not to be present if the AFT Counter is not initialized.

$YCCCF^1$ may be the Year, page Count (e.g., the page Count may have a maximum such as 262,143), and Frequency. In some embodiments, Y should match the Y of $YMD^1$.

$YCCCF^2$ may be the Year, page Count, and Frequency of the last Y prior to $YCCCFF^1$ in which the user visited. In some embodiments, Y should match the Y of $YMD^1$.

$YCCCF^3$ may be the Year, page Count, and Frequency of the last Y prior to $YCCCFF^2$ in which the user visited.

Other variables and codes may be used.

In some embodiments, some or all of these variables (e.g., $YMDC^N$, $YMCCF^{2-4}$, or $YMCCCFF^{2-3}$) may be present or not present. In some embodiments, it may only be possible for one or more particular elements (e.g., $YMD^1$, $C^d$, 0, $YMCCF^1$, or $YCCCFF^1$) of the string to not be present if the AFT Counter is not initialized.

An AFT Test may occur, e.g., when a frequency directive is used. The result and what is tested against may be controlled by a test parameter. The result value may be stored in a variable denoted by the variable parameter. An AFT Test String may have the form:

$Op^1VarResult^1TargetField^1Value^{lo1}Value^{hi1}$ . . . [may repeat]

Where, in sequence:

$Op^1$ may be a number, symbol, or code (e.g., a two-digit base 64 digit) indicating the operation to perform on a variable if the test is successful.

$VarResult^1$ may be a number (e.g., a base 64 digit or other code) to apply to var (e.g., based on Op) if the test is successful.

$TargetField^1$ may be a number (e.g., a base 64 digit or other code) indicating the target field in the AFT Counter to test against.

$Value^{lo1}$ may be a number (e.g., a three-digit base 64 digit) containing the lower limit of the value to test against.

$Value^{hi1}$ may be a number (e.g., a three-digit base 64 digit) containing the lower limit of the value to test against.

"Op" may be a bit mask where the bits have the following meanings:

The bits 0 and 1 (e.g., corresponding to decimal values 0-3) may indicate the following:

0 may indicate to set var equal to VarResult if the $TargetField^1$ is greater than or equal to $Value^{lo1}$ and less than or equal to $Value^{hi1}$.

1 may indicate bitwise and/or the current value of var with VarResult if the $TargetField^1$ is greater than or equal to $Value^{lo1}$ and less than or equal to $Value^{hi1}$.

1 may indicate bitwise OR the current value of var with VarResult if the $TargetField^1$ is greater than or equal to $Value^{lo1}$ and less than or equal to $Value^{hi1}$.

1 may indicate bitwise AND the current value of var with VarResult if the $TargetField^1$ is greater than or equal to $Value^{lo1}$ and less than or equal to $Value^{hi1}$.

2 (decimal value 4) may indicate the end parse of a test string if $TargetField^1$ is greater than or equal to $Value^{lo1}$ and less than or equal to $Value^{hi1}$.

3 (decimal value 8) may indicate the end parse for a test string if var is non-zero after this operation.

4 (decimal value 16) may indicate to use the $TargetField^1$ as the VarResult value. This bit may be used, e.g., if a user 10 was on a particular domain or sub-domain a certain number of times (e.g., six times) in a prior month.

5 (decimal value 32) may indicate to return the Lightweight Time value of the $TargetField^1$.

6 (decimal value 64) may indicate to not increment the Counter. In some embodiments, this may be used in the first Op if used at all.

7 (decimal value 128) may indicate use of GMT time (or normal local time or another time schema).

Other codes and digits may be used.

It should be noted that in some embodiments, although the test string exclusively deals with base 64, the value returned in var may be decimal unless it is returning a Lightweight Time value.

In some embodiments, the following values may correspond to the following fields:

0—$YMD^1$; 1—$C^d$; 2—$YMDC^1$ (Lightweight Time); 3—$YMDC^1$ (Count); 4—$YMDC^2$ (Lightweight Time); 5—$YMDC^2$ (Count); 6—$YMDC^3$ (Lightweight Time); 7—$YMDC^3$ (Count); 8—$YMDC^4$ (Lightweight Time); 9—$YMDC^4$ (Count); 10—$YMCCF^1$ (Lightweight Time); 11—$YMCCF^1$ (Count); 12—$YMCCF^1$ (Frequency); 13—$YMCCF^2$ (Lightweight Time); 14—$YMCCF^2$ (Count); 15—$YMCCF^2$ (Frequency); 16—$YMCCF^3$ (Lightweight Time); 17—$YMCCF^3$ (Count); 18—$YMCCF^3$ (Frequency); 19—$YMCCF^4$ (Lightweight Time); 20—$YMCCF^4$ (Count); 21—$YMCCF^4$ (Frequency); 22—$YCCCFF^1$ (Lightweight Time); 23—$YCCCFF^1$ (Count); 24—$YCCCFF^1$ (Frequency); 25—$YCCCFF^2$ (Lightweight Time); 26—$YCCCFF^2$ (Count); 27—$YCCCFF^2$ (Frequency); 28—$YCCCFF^3$ (Lightweight Time); 29—$YCCCFF^3$ (Count); and 30—$YCCCFF^3$ (Frequency).

Other values and fields may be considered.

The frequency module 28 may store frequency information (or other information) in the frequency database 28, the user experience database 56, cookie database 58, and/or any user 10 storage system (e.g., as a cookie in a user's 10 computer). The frequency module 28 may accomplish any of its functions in conjunction with the cookie module 32.

User experience module 30 may receive and identify user experience data, and it may store such data in the user experience database 56. User experience data may comprise any data relating to a user's experience with the server 2 (or a provider 8), including: data passed to the user 10 by the server 2; information received by the user 10 from the server 2; selections made by the user 10 (e.g., advertisements and links selected by the user); time spent on a particular document or type of document; location data of the user; content stored, highlighted, or otherwise identified by the user; and any other data associated with the user and the content provided to the user. For instance, the server 2 may receive video data of the user 10 viewing content received by the server, and the user experience module 30 may process the video data to determine what content the viewer was looking at while visiting a particular domain.

For instance, user experience database 56 may store user feedback information. Users 10 may provide feedback or other information in response to receiving content, e.g., a document provided to the user 10 by the server 2. Users 10 may also visit a website displayed in a document to leave feedback. Feedback and other user communication may be accomplished by any means of communication, including email, IRC (Internet relay chat), ICQ, instant messaging, phone, or other means, such as directly providing feedback at a physical establishment associated with the content source or document host. The communication module 26 may communicate with such responsive users, e.g., by receiving feedback, enabling the user to purchase a product (e.g., an advertised product or product associated with an advertised brand) at a website, display content (such as ads) requested by the user at the display 8, or otherwise interact with a user 10.

Cookie module 32 may pass user experience information (e.g., frequency information) to be stored in a user database, e.g., in a cookie on a user's 10 computer or in cookie database 58. The user experience information may comprise any of the information that may be stored in frequency database 54 and/or user experience database 56. Cookie module 32 may also update (e.g., add to or replace with current and/or comprehensive information) the cookie(s) at any time, such as when new user information is received or determined, or when a user ends a session of browsing a particular domain. For instance, the cookie module 32 may add information to an existing cookie each time a user clicks on a new webpage at a particular domain that represents information about the user's action, such as the address of the requested page.

When a user logs in to an account associated with the server 2 or a particular domain, cookie module 32 may also inspect the user's cookies to determine whether the user's computer (or other access device) has a related cookie. If so, content provided to the user may be based on this information. The cookie module 32 may also store this information (or any other information) in the user experience database 56 and/or frequency database 54.

Cookie module 32 may also update (e.g., add to or replace) a cookie when a user logs into an account. For instance, when the user logs in (e.g., using a remote computer that does not have cookies stored from prior experiences with the domain), cookie module 32 may access stored user experience information (e.g., from frequency database 54 and user experience database 56) and pass this information to be stored in a cookie at a user's 10 computer. In this way, cookie module 32 may also replace lost cookies or other user data, e.g., cookies that have been deleted or are otherwise inaccessible during a particular communication session between the user 10 and server 2.

It should be noted that frequency database 54 and 56 coupled to the server 2 may serve the same function as cookies stored at a user 10 computer in terms of selecting content based on user experiences. Essentially, the cookies and the databases 54 and 56 represent two alternate (and also complementary) elements for accomplishing some of the functions of the present invention.

When a user later logs into an account associated with the domain, cookie module 32 may check cookie information and pass it to the databases 54, 56 and also to the content selection module 34, so that content can be passed to the user based on the experience information.

A content selection module 34 may select and provide documents to be passed to a user 10, e.g., in response to a request for content from a provider 8, end user 10, or other entity. For instance, a user may request the web page of a particular subset of a domain (e.g., www.channel1.domain.com). In response, the content selection module 34 may select a document based on the request and based on user experience (e.g., frequency) information. If there is no prior experience information available, then standard content may be selected and passed.

The content selection module 34 may identify recipient information, e.g., by inspecting "cookies" on an end-user's computer or by inspecting user experience data (e.g., frequency data) stored in a database entry associated with the user in the frequency database 54 and/or user experience database 56. For instance, the content selection module 34 may identify user experiences of an end user 10 based on prior information received from the end user, such as selections of a prior provided document.

Content selection module 34 may select one or more documents from the content database 52. Content may be selected based on user experience data, account data, frequency data, and/or other data. For instance, the content selection module 34 may select a document based on the frequency with which a user visits a particular domain (or a sub-area of a particular domain), or the frequency with which a user selects a particular type of content. Content selection module 34 may similarly select content based on a user's failure to select particular types of documents (e.g., articles and ads related to automobiles). Based on this information, the content selection module 34 may avoid selecting automobile-related content to provide to the user 10. The content selection module 34 may select content based on the user experience (e.g., frequency) data as described elsewhere herein.

Document generation module 36 may generate documents to pass to users 10. For instance, document generation module may configure and/or generate documents based on content selected by the content selection module 34. Document generation module 36 may assemble the selected content into a single document and pass the document to the communication module 26, which may pass the document to users 10 (e.g., via providers 8).

Other module 46 may accomplish other functions.

The database 4 may comprise a plurality of databases, such as content database 52, frequency database 54, user experience database 56, cookie database 58, account database 60, and other database 62.

Content database 52 may store content, e.g., content that may be passed to a user, or content that has been passed to a user. For instance, content database 52 may store documents received from content sources 12 and documents generated by document generation module 36.

Frequency database 54 may store frequency data, e.g., frequency data received from the frequency module 28 and/or the user experience module 30. Frequency data may comprise the frequency with which a user visits a particular domain or selects a particular type of content, as discussed above.

User experience database 56 may store user experience data received from the user experience module 30 and/or the frequency module 28. This data may comprise any data as discussed with respect to the modules 28, 30. For instance, user experience database 56 may store information received during communications with users, e.g., when users access an interactive display device 8 to purchase an item or otherwise access the server 2 (e.g., a server 2 website).

Cookie database 58 may store cookie information, e.g., information that has been or may be stored in a cookie with a user. Cookie database 58 may also be used to back up cookie data associated with each user 10. In this way, the cookie data may be accessed and loaded onto a user's access device if a prior cookie has been lost or is otherwise inaccessible (e.g., if the user 10 is not using the same computer that stored the prior cookie). Cookies in cookie database may also be updated by cookie module 32 as new experience (e.g., frequency) data is received or processed.

Account database 60 may store user data and/or user account data. User and user account data may comprise information concerning a user's name, address, birth date, social security number, income, job status, password, PIN, account, prior content received, prior content selected, time associated with particular content (e.g., the time between user content requests, the time spent viewing a particular web page or other document, or the time since a domain or particular page-type was last requested), membership data (e.g., any memberships associated with the account, such as a membership in a film club or other user group), time associated with membership data, and other user-related or account-related information. The user 10 and user account data may also comprise frequency information related to any of the above-mentioned data.

Other database 62 may store other information.

Each module 20-38 and database 50-62 may comprise input and output devices for passing information to (and receiving information from) other system 100 components, such as other modules and databases.

Illustrative System Network Environment

Figure 2:
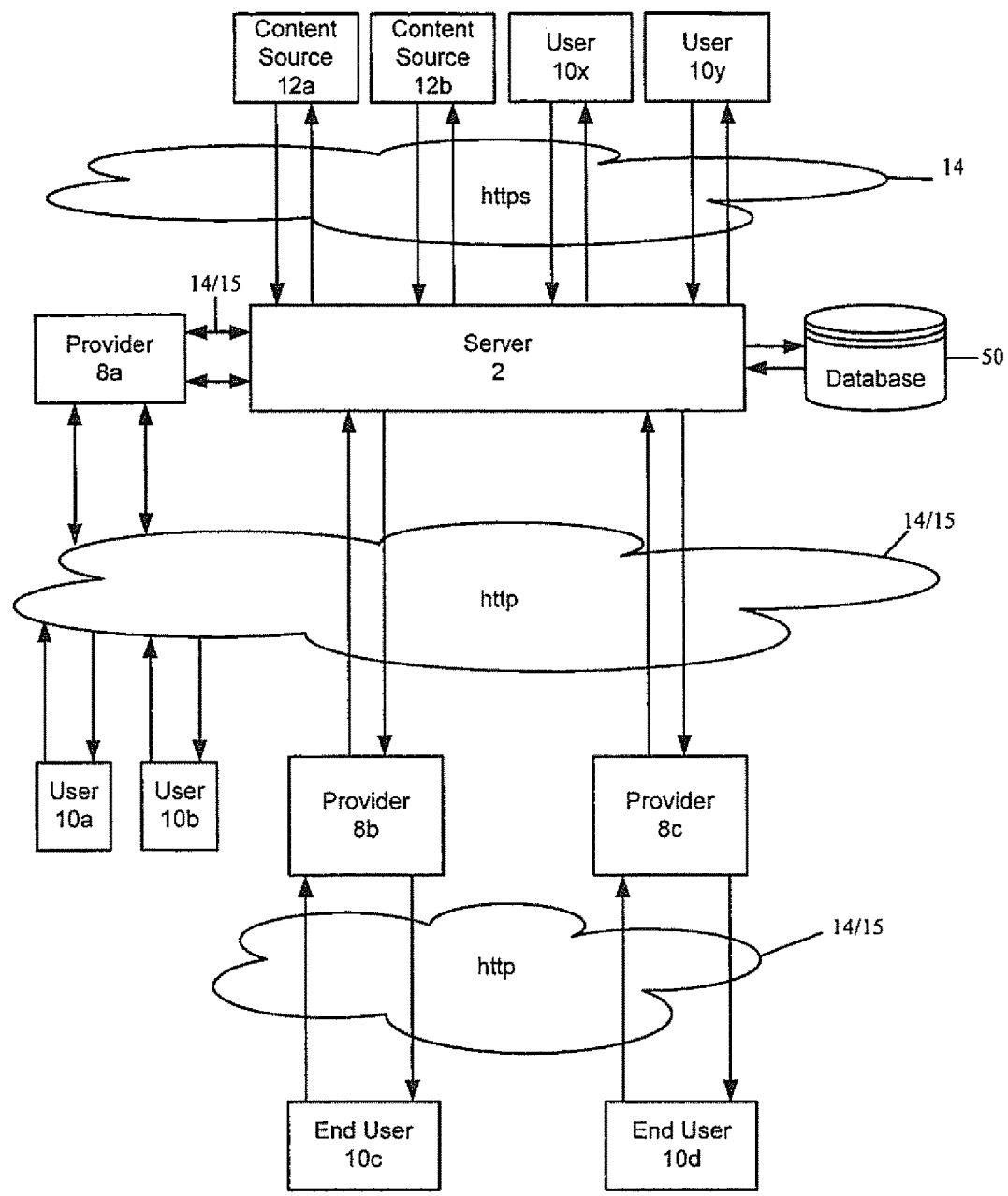
FIG. 2 depicts a networked environment for operation of a system for providing content to a user based on prior content provided to the user according to an embodiment of the invention.

FIG. 2 depicts a networked environment for operation of a system for providing content to a user based on prior content provided to the user according to an embodiment of the invention. In such an environment, providers 8 may connect over a network 14, 15 to a server 2 (e.g., using a secure https connection) to provide documents and concept association information to server 2 and to receive documents and rating request information from server 2. The server 2 may store the document, rating, and performance information in a database 4. The server 2 may distribute the documents through various forums or feeds, including direct distribution in print media, providing the documents on one or more web sites affiliated with the server 2 and through providers 8. It should be noted that providers may comprise syndication partners of the server 2 (e.g., connected over network 14 or 15 depending on security desired), content systems (e.g., with associated content databases) and search engine systems operated by the server 2 or provider(s) 8.

Through these various forums, the documents provided to the providers 8 may be included in pages (or other documents) displayed to end-users 10 (often called an impression).

Each of server 2, providers 8, and content sources 12 may comprise computerized systems that include one or more of the following systems: a web server, a database server, proxy server, network balancing mechanisms and systems, and various software components that enable the system to operate on the Internet or other network type system. Additionally, networks 14 and 15, although depicted as http networks, may comprise other networks such as private lines, intranets, or any other network. In an exemplary embodiment, the connection between a content source 12 such as an advertisement provider and server 2 (and other connections such as between a provider 8 and server 2) may comprise secure network connections to insure that data is not subject to attack or corruption by any hacker or other third party. In addition, whereas two associating entities and two document providers 12 are depicted, it should be appreciated that one or more associating entities and one or more content sources 12 may be provided in the network. Similarly, although one database 50 is depicted, it should be appreciated that multiple databases may be provided and that such databases may be connected to the server 2 via any type of network connection, including a distributed architecture for server(s).

Similarly, provider 8 may comprise any number of such systems connected to the associating entity or server 2 via any type of network, including an http or https network. Provider 8 may comprise a system such as server 2 that provides functionality for enabling connection over the Internet or other network protocols. End users 10 may comprise any user (such as users connected to the Internet) and may comprise computerized systems that enable that connection through any of various types of networks, including through Internet service providers, cable companies, and any other method of accessing data on the Internet. Providers 8 may comprise any system that distributes content such as advertising to end users 10.

Illustrative Process

Figure 3:
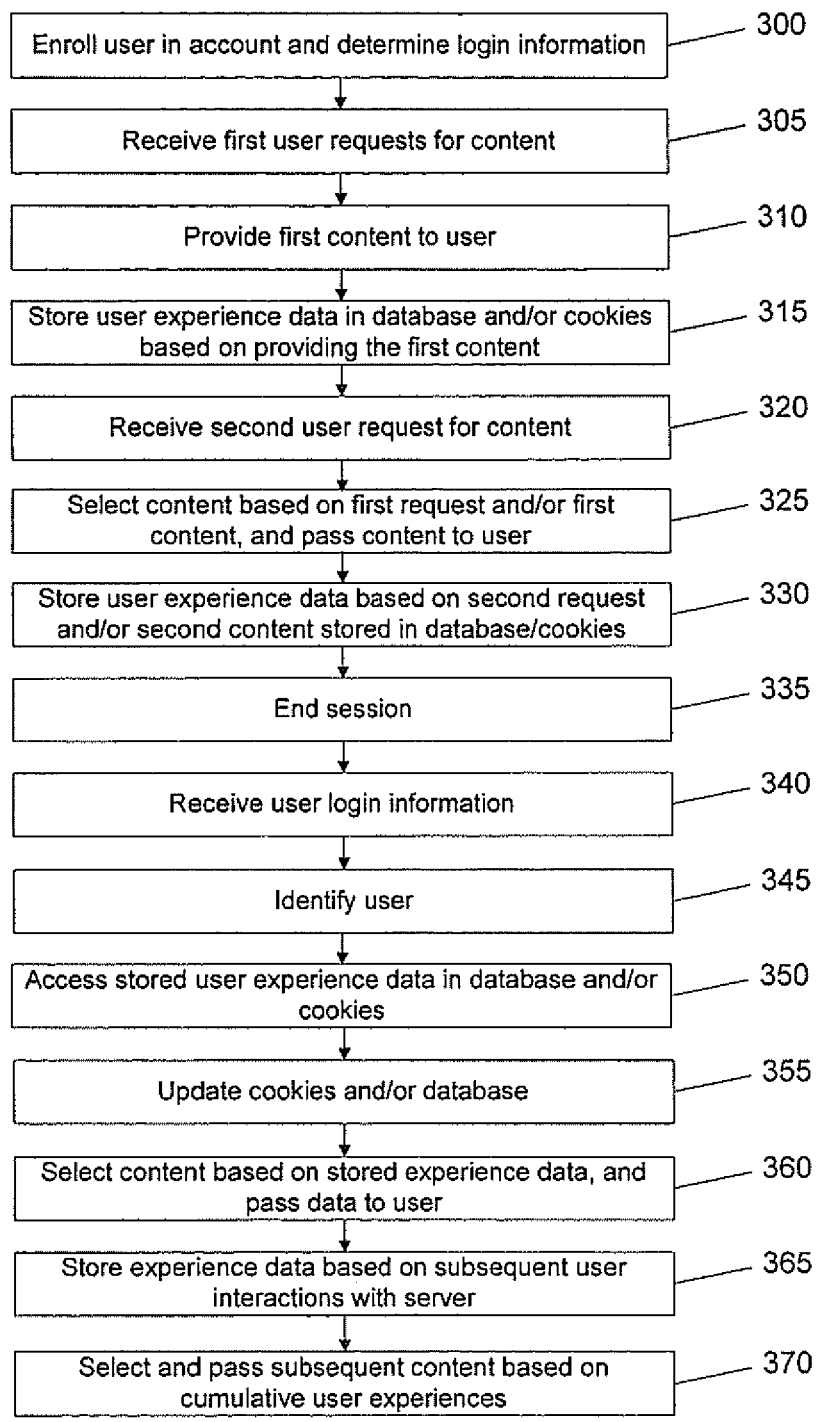
FIG. 3 is a flow chart illustrating an exemplary method for providing content to a user based on prior content provided to the user according to an embodiment of the invention.

FIG. 3 is a flow chart illustrating an exemplary method for providing content to a user based on prior content provided to the user according to an embodiment of the invention.

In block 300, a user may be enrolled in an account, e.g., an account associated with a particular domain (e.g., www- .domain.com) or a channel (or other subset) of the domain. User membership and account information may be received and stored, e.g., in an account database such as a user computer or cookie. The account information may be used to identify the enrolled user and verify the user's identity when the user subsequently accesses the server 2 (such as at a website) (or other information relating to membership). For instance, the user may choose (or be assigned) a user id and password, which the user may use to login to the site and thus enable the server to identify the user.

In some embodiments, the user may not enroll in an account, or the user may enroll in an account at a later time.

In block 305, first user requests for content may be received. For instance, a user may visit a website domain (e.g., www.domain.com) or a particular channel (or other subset) of the domain. Visiting a site may comprise a request for site information. The user may also request additional content, such as information about a particular channel or advertisement, e.g., by clicking a hypertext link on a displayed web page.

In block 310, first content may be provided to the user. For instance, in response to the request for content, the server may provide content to the user. If the user selects an automobile channel at www.domain.com, the server may direct the user's browser to the channel site (e.g., www.automobile.domain.com). If the user requests an advertisement, the server may pass advertisement information to the user (e.g., the server may direct the browser to a webpage related to the advertisement).

In block 315, user experience data may be stored in a database. For instance, the server may store information associated with the various content requests made by the user (e.g., the names of the various hypertext links requested). The server may also store information associated with the content displayed to the user, such as the names of various content features passed to the user and the formatting of the features. The server may also store frequency information, e.g., information indicating the number of times (or number of times per session or time period or other time metric) a particular event occurred, such as the number of times a user visited a particular site. For instance, the server may store information indicating that the user received a webpage featuring an automobile advertisement at the top and an invitation to join a film club at the bottom of the page, and that the user subsequently received the same invitation on three additional pages in a single user session before logging out or closing the browser.

The data may be stored in a central database and/or in one or more cookies on a device used by the user to access the server 2 (e.g., a user's personal computer or web-enabled PDA).

In block 320, a second user request for content may be received. For instance, a user may visit the domain, click a link, and/or login to a domain or channel.

In block 325, content may be selected based on the user's request and/or the content provided to the user. The selected content may then be passed to a user. For instance, content may be selected by the content selection module 34, and a corresponding document may be created by document generation module 36.

For instance, if the user previously selected automobile-related information and visited four websites in the automobile domain, then the selected content may comprise a link to the automobile guide page, even if the request was not associated with automobiles (e.g., if the request comprised a request to login to the user's domain account or to view content related to sports). Ads may be displayed on the page that are related to prior user requests for content, e.g., automobile ads.

Similarly, the selected content may not contain content that was previously passed to viewer on one or more occasions but did not trigger any response from the user. For instance, if the user received an invitation to view a food-related site or join a sports-related group (e.g., a user group hosted on a sports channel at the domain), then the selected content may not comprise either of these invitations.

In block 330, user experience data based on the second request and/or the second provided content (and/or any reactions to the content) may be stored in a database. The data may indicate that the user selected another automobile-related page, or that the user received an automobile-related ad but failed to request additional information about the ad. The data may be stored as one or more cookies on a device used by the user to access the server 2. In some embodiments, the data may alternately or in addition stored in a central database.

In block 335, the user's communication session with the server may be ended. For instance, the user may logout, terminate an Internet connection, or close a browser. In some embodiments, such actions may effectively cause the user to be logged out of the account, and the server may stop tracking the user's behavior (e.g., the server may determine that the identified user is no longer communicating with the server).

In block 340, user login information may be received. For instance, the user may login to a user account associated with the domain to start another browsing session. The login information may be verified by the account module 22 by comparing it to membership information stored in the account database 60.

In block 345, the user may be identified, e.g., based on the user's login information. For instance, the server may determine the name or user id of the user, or the server may otherwise distinguish the user from other users.

In block 350, the server may access any stored user experience data, e.g., data stored in a cookie at a user access device database or at a central database such as cookie database 58 or user experience database 56. For instance, if user experience data was stored in a cookie on the user's computer, the server may access the cookie information. The cookie information may direct the server to user experience data stored in a central database, which the server may access and process. In some embodiments, the server may access user experience data stored in a database (e.g., user experience database 56).

In block 355, a cookie and/or other database may be updated. For instance, a cookie (e.g., the most recent cookie stored for the identified user) may be uploaded to the user's access device. This action may occur at any time when the server 2 determines that the cookie database to be updated is associated with the user. The action described in this block may comprise creating a cookie in a cookie database associated with the user or the processor.

In some embodiments, the cookie and/or other database may be updated each time new experience information is determined, received, or processed. For instance, each time a user selects content, information about the selection or the selected content may be stored. The information may comprise frequency information. For instance, the information may comprise a running tally of the number of times a user has accessed a particular domain or subset of the domain (e.g., a channel). If the user has previously visited a film channel four times (and corresponding information is stored in the database, such as "film=4" or film=XXXX), then a fifth visit may cause the database to be updated to change the "4" to a "5" in "film=4" to read "film=5", or to add an "X" at the end of "film=XXXX" to read "film=XXXXX." Similarly, frequency data for non-interactions may be updated. If the user has previously received sports data six times but only selected the data once (e.g., indicated by an entry in the database of "sports=1;nosports=5") and the user subsequently receives but fails to interact with a seventh sports content, the "5" in the database entry may be changed to a "6."

In some embodiments, time data may also be stored and updated. For instance, when a user views a web log (also called "blog") at the site www.blog1.domain.com at 9:30 am on Oct. 1, 2004, this information may be stored as "blog1=10/01104/09:30". This information may be updated to "blog1=10/02/04/12:30" if the user later views the same blog at 12:30 pm the following day.

In block 360, content may be selected based on stored experience data, and the content may be passed to a user (e.g., an identified user who requested content).

In the example above, if the server determines that the 9:30 am blog visit is the user's first visit to the blog, then it may display all or a predetermined portion of the blog (e.g., entries from the prior seven days). When the user later returns at 12:30 pm on October 2, the server may identify the time of the last visit based on the stored information and accordingly display only the new content since 9:30 am of the prior day. In addition, the database entry may be updated to be "blog1-10/02/04/12:30". If the user has previously requested automobile content, an automobile advertisement may be displayed.

In block 365, experience data based on subsequent user interactions with the server (e.g., further content selections made by the user and additional content provided to the user) may be stored. This data may be stored in a cookie or in another database, as discussed above. For instance, the server may store information indicating that the user visits a specific domain approximately once a week and a specific guide site once a month.

In block 370, subsequent content may be selected and passed based on cumulative user experiences. The content may be selected and passed as discussed above.

For instance, the server may classify users according to their experience data, and it may select content based on the classifications. For instance, if a particular user has visited a particular channel more than 100 times, the server may classify the user as a "regular user". Accordingly, a database (e.g., cookie) will store the user's "regular" status with respect to the channel, and the server may provide a link to the channel whenever the user visits other pages related to the site. If a particular user has contributed over 500 posts to a particular community message board and received positive feedback (e.g., if the posts were accepted by a site moderator or rated highly by other users), the user may be classified as a "frequent user" and/or invited to be an advisor, expert, or moderator of the community message board. The database may store information indicating the user's "moderator" status, and the user may receive moderator-only content based on this designation.

The actions of all or merely some of the blocks may be accomplished within the scope of this invention. The actions may be completed in any order, and they may overlap in time with other actions.

Illustrative Content Provisions

Figure 4:
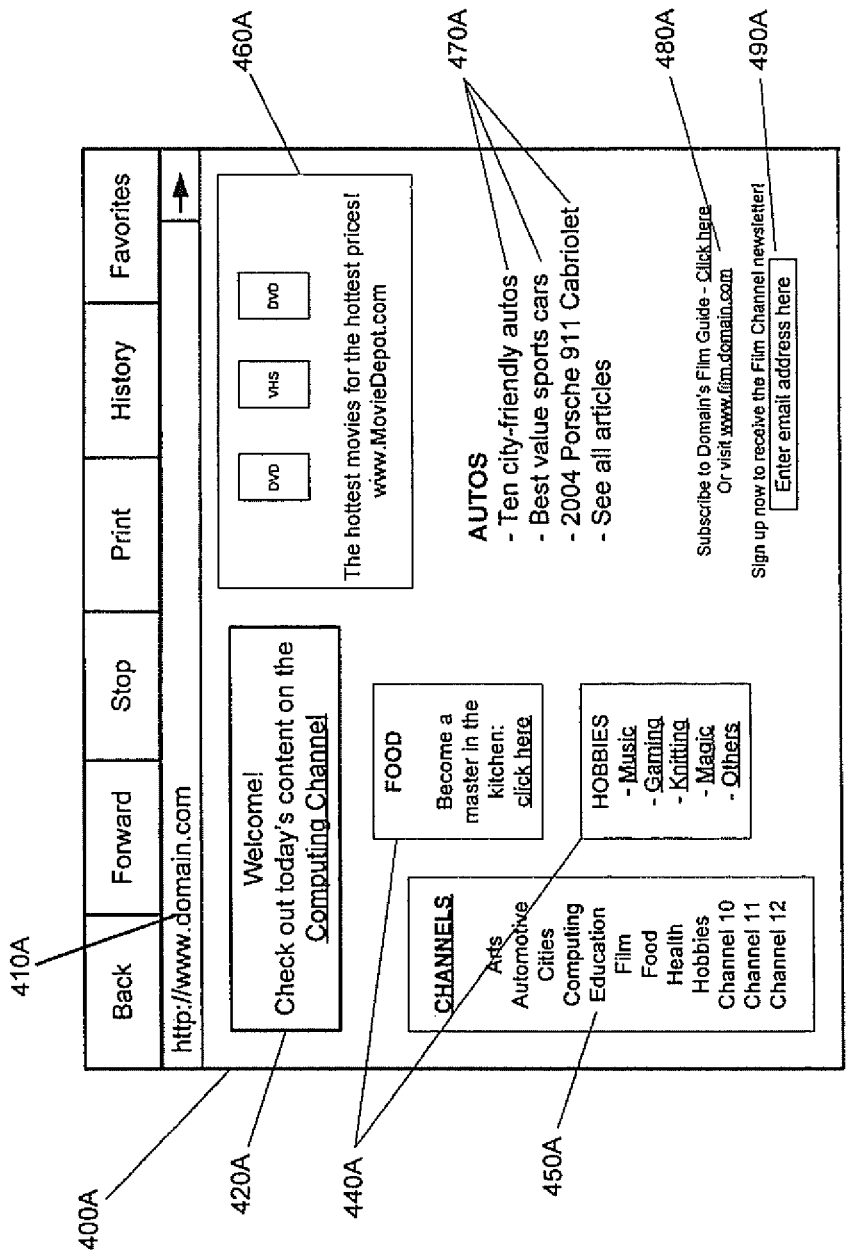
FIG. 4 illustrates an exemplary provision of content to users according to an embodiment of the invention.

FIG. 4 illustrates an exemplary provision of content 400A to users according to an embodiment of the invention. The FIG. shows a website domain 10A, a welcome message 420A comprising an invitation to view content at a particular subset of the domain (e.g., a guide site or "channel" of content), channel documents 440A comprising links to channel content, a list of channels 450A, one or more advertisements 460A (e.g., an ad for DVDs), links to articles 470A (e.g., links to articles at a particular channel), an invitation to create an account 480A, and an invitation to register to receive content such as a newsletter 490A.

Figure 5:
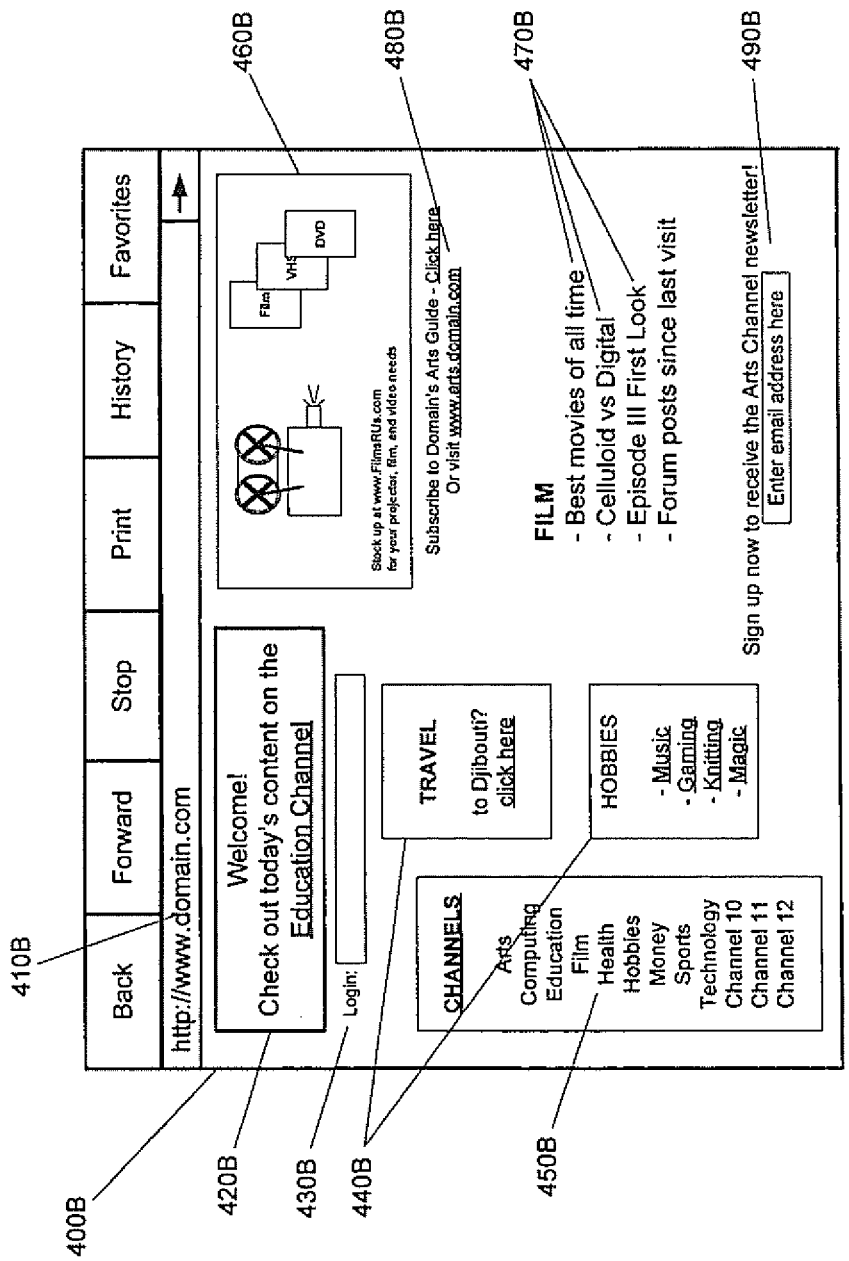
FIG. 5 illustrates an exemplary provision of content to users according to an embodiment of the invention.

FIG. 5 illustrates an exemplary provision of content 400B to users according to an embodiment of the invention. The content 400B may be provided to a user based on one or more prior user experiences, such as one or more prior user visits to the domain. Here, the requested domain page is identical since both documents have the same web address 410A, 410B.

The content in FIG. 5 is analogous to the content in FIG. 4. Both figures include an identical document relating to hobbies 440A, 440B. FIG. 5 also shows an advertisement 460B in the upper right-hand corner of the document 400B and a list of channels 450B in the lower left.

However, the content in FIG. 5 may be modified or generated based on prior user experiences. If a user clicked on the invitation to subscribe to the film guide in 480A, then a subsequent document 400B may place another invitation in a more prominent position in the document (e.g., higher up in the document). An invitation may be selected that is related by subject matter to the user's prior experience. Because the user selected film content 480A in a prior experience, the subsequent invitation 480B may also be related to arts and entertainment. Similarly, the suggested newsletter 490B may be selected based on the user's interest in film. An advertisement related to similar subject matter may be displayed 460B, especially if the user selected the prior advertisement 460A related to movies. The list of channels featured in 450B may be different, and it may reflect the user's visits to prior channels as well as recommendations for other channels based on the user's experience.

Based on the user's frequent visits to a film channel, the server may create a page layout that more prominently features film content 470B.

If the user has visited a forum on film (e.g., at a film channel), the featured film content 470B may enable the user to view only the most recent posts (e.g., since the user's last visit) based on the user's prior login time.

Cookies on a user's computer may be used to determine other content. For instance, if cookies indicate that the user has an account with www.domain.com, then the server 2 may select login content 430B to enable users to login to their accounts. In some embodiments, login content 430B may be provided or not provided depending on a frequency of use or disuse, respectively, by the user. For instance, if a particular user (or particular computer) fails to select login content 430B after twenty viewings of the login content, then such content may not be subsequently provided to the user or computer. It should be appreciated that in some embodiments login content 430B may be provided automatically to all users regardless of login frequency.

It should be understood that the server, processors, and modules described herein may perform their functions (e.g., determining prior content passed to the user) automatically or via an automated system. As used herein, the term "automatically" refers to an action being performed by any machine-executable process, e.g., a process that does not require human intervention or input.

The embodiments of the present inventions are not to be limited in scope by the specific embodiments described herein. For example, although many of the embodiments disclosed herein have been described with reference to domain sites and guide sites, the principles herein are equally applicable to other provided content, such as television and radio programming, music downloads, and other content. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although the embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein.

The invention claimed is:

1. A computer implemented system that provides Internet content to a user based on prior user experience, the computer implemented system comprising:
    an output device that transmits, via a communication network, first content to a user, wherein at least some of the first content is transmitted in response to one or more user content selections;
    a data storage controller that directs storage of frequency information associated with the user related to at least one of the first content and the one or more user content selections, wherein the frequency information tracks a frequency with which the user interacts with the first content and the frequency information and is used for classify the user in one or more user classification groups;
    a receiving device that receives, via a communication network, a request for content from the user; and
    a computer processor that selects second content for the user based on the frequency information wherein the frequency information indicates whether the user has selected a particular subset and determines that the user has exceeded a frequency threshold based on the frequency information, wherein the frequency threshold has at least one of a bottom value and a top value such that exceeding the frequency threshold, either above or below the frequency threshold, moves the user to another classification group and further transmits the second content to the user, via a communication network.

2. The system of claim 1, wherein the one or more user content selections comprise requests for content from a specific content provider or specific web domain.

3. The system of claim 1, wherein the frequency information comprises information relating to a frequency of a particular event related to content received by the user.

4. The system of claim 1, wherein the frequency information comprises information relating to a frequency of a particular event related to the user content selections.

5. The system of claim 1, wherein directing storage involves directing storage of the frequency information in a cookie in a user storage system located in a mobile device.

6. The system of claim 1, wherein the selected second content comprises at least one of: a web page, an advertisement, a pop-up, an animation, an email, sound content, video content, text content, and a graphic.

7. The system of claim 1, wherein the second selected content is selected based on the frequency of the user accessing information at a specific domain on the Internet.

8. The system of claim 1, wherein the second selected content is selected based on the frequency of a user accessing a specific subset of accessible web pages at a specific domain on the Internet.

9. The system of claim 1, wherein the second content comprises at least one selected from the group comprising:
    an invitation to join a group associated with the frequency threshold;
    an invitation to receive a type of content associated with the frequency threshold; and
    content that is accessible only to users who have exceeded the frequency threshold.

10. The system of claim 1, wherein the request for content is received from a content provider, and wherein the frequency information is stored in an entry at a storage system, and wherein the entry is associated with the user and is updated based on subsequent information transmitted between the user and the content provider.

11. A computer implemented method for providing content to an internet user based on at least one prior user experience, the computer implemented method comprising the steps of:
    transmitting, via a communication network, first content to a user, wherein at least some of the first content is transmitted in response to one or more user content selections;
    directing storage of frequency information associated with the user related to at least one of the first content and the one or more user content selections, wherein the frequency information tracks a frequency with which the user interacts with the first content and the frequency information is used to classify the user in one or more user classification groups;
    receiving, via a communication network, a request for content from the user;
    automatically selecting second content for the user based on the frequency information wherein the frequency information indicates whether the user has selected a particular subset of content;
    determining that the user has exceeded a frequency threshold based on the frequency information, the frequency threshold having at least one of a bottom value and a top value such that exceeding the frequency threshold, either above or below the frequency threshold, moves the user to another classification group; and
    transmitting, via a communication network, the second content to the user.

12. The method of claim 11, wherein the one or more user content selections comprise requests for content from a specific content provider or specific web domain.

13. The method of claim 11, wherein the frequency information comprises information relating to a frequency of a particular event related to content received by the user.

14. The method of claim 11, wherein the frequency information comprises information relating to a frequency of a particular event related to the user content selections.

15. The method of claim 11, wherein directing storage involves directing storage of the frequency information in a cookie in a user storage system located in a mobile device.

16. The method of claim 11, wherein the selected second content comprises at least one of: a web page, an advertisement, a pop-up, an animation, an email, sound content, video content, text content, and a graphic.

17. The method of claim 11, wherein the second selected content is selected based on the frequency of the user accessing information at a specific domain on the Internet.

18. The method of claim 11, wherein the second selected content is selected based on the frequency of a user accessing a specific subset of accessible web pages at a specific domain on the Internet.

19. The method of claim 11, wherein the second content comprises at least one selected from the group comprising:
   an invitation to join a group associated with the frequency threshold;
   an invitation to receive a type of content associated with the frequency threshold; and
   content that is accessible only to users who have exceeded the frequency threshold.

20. The method of claim 11, wherein the request for content is received from a content provider, and wherein the frequency information is stored in an entry at a storage system, and wherein the entry is associated with the user and is updated based on subsequent information transmitted between the user and the content provider.

* * * * *